United States Patent
Borsan

(10) Patent No.: US 7,146,163 B2
(45) Date of Patent: Dec. 5, 2006

(54) SENDER-ADDRESS-BASED TELECOMMUNICATIONS OPERATOR CALLBACK SYSTEM AND METHOD

(75) Inventor: Dumitru Borsan, San Diego, CA (US)

(73) Assignee: ISP Operator Corporation, San Diego, CA (US)

( * ) Notice: Subject to any disclaimer, the term of this patent is extended or adjusted under 35 U.S.C. 154(b) by 309 days.

(21) Appl. No.: 10/262,485

(22) Filed: Oct. 1, 2002

(65) Prior Publication Data

US 2004/0063432 A1    Apr. 1, 2004

(51) Int. Cl.
   *H04Q 7/20*    (2006.01)
   *H04Q 11/00*   (2006.01)
   *H04M 3/42*    (2006.01)
   *H04L 12/16*   (2006.01)
   *H04L 12/28*   (2006.01)

(52) U.S. Cl. .................... 455/422.1; 370/260; 370/392; 379/201.01; 379/209.01; 379/210.01

(58) Field of Classification Search ........... 379/201.01, 379/209, 209.01, 210.01; 455/422, 445, 455/422.1; 370/260, 392
See application file for complete search history.

(56) References Cited

U.S. PATENT DOCUMENTS

| | | | | |
|---|---|---|---|---|
| 5,351,237 A | * | 9/1994 | Shinohara et al. | 370/392 |
| 5,661,790 A | * | 8/1997 | Hsu | 379/209.01 |
| 6,374,102 B1 | * | 4/2002 | Brachman et al. | 455/422.1 |
| 6,463,144 B1 | * | 10/2002 | Dunn et al. | 379/210.01 |
| 6,480,474 B1 | * | 11/2002 | Johnson et al. | 370/260 |
| 2003/0002642 A1 | * | 1/2003 | Jorasch et al. | 379/201.01 |

* cited by examiner

*Primary Examiner*—William D. Cumming
(74) *Attorney, Agent, or Firm*—Steins & Associates, P.C.

(57) ABSTRACT

A Sender-Address-Based Telecommunications Operator Call-back System and Method is disclosed. Unlike the prior systems, the present invention eliminates the use of a direct inward dialing telephone number. The system recognizes a triggering email or SMS message and associates the message to a particular authorized user. Once authorized, the system places a call to the caller and then places a call to the called person. The triggering email or SMS message only requires minimal special formatting, such as containing the sender's registered email address in the "from" field and the called number in the "subject" field. The system may permit third party persons to be authorized to make collect calls to the account holder on the account holder's account. The system may further provide the user with periodic account balance updates both manually and automatically as calls are being made.

9 Claims, 7 Drawing Sheets

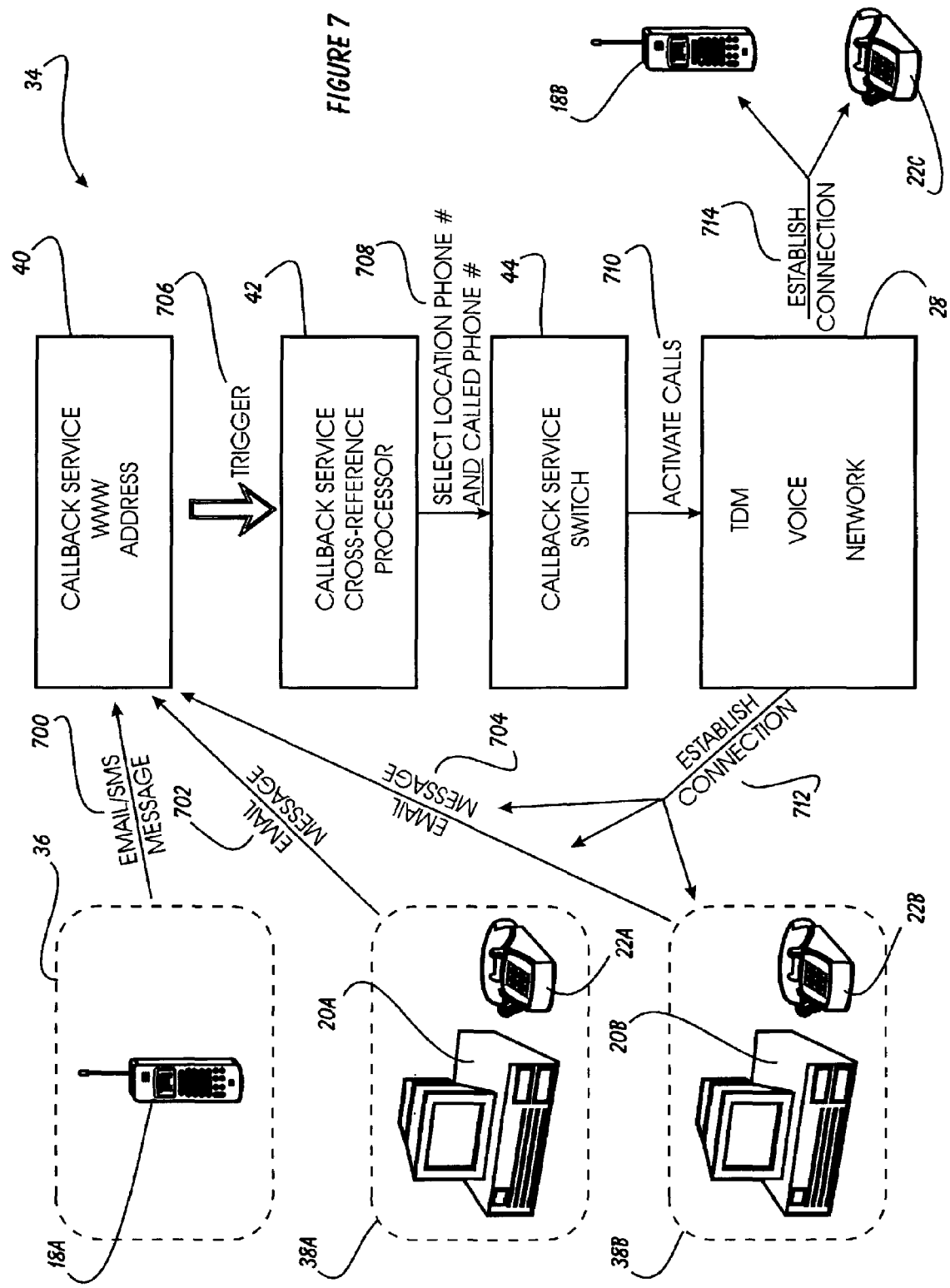

140
SENDER-ADDRESS-BASED TELECOMMUNICATIONS OPERATOR CALLBACK SYSTEM AND METHOD

BACKGROUND OF THE INVENTION

1. Field of the Invention

This invention relates generally to telecommunications systems and, more specifically, to a Sender-Address-Based Telecommunications operator call-back System and Method 2. Description of Related Art Domestic and international callback has become a widely offered technology to assist companies and individuals to drastically reduce their long distance telephone charges. Since its introduction, companies in the United States and abroad have been overwhelmed by the demand for this new technology. Both domestic and international long distance charges are reduced because instead of routing calls through the local phone companies (either domestically or internationally), the callback system routes the calls through networks that are in place in the United States (at bulk pricing that tends to be much lower than that available to the public).

Conventionally, the callback process has required the user to dial an assigned telephone number, after which a variety of steps must be conducted; an example of one system is provided in FIG. 1.

FIG. 1 depicts the conventional callback process 10. As shown, the process 10 for a user to make a telephone call using the conventional callback system commences with the caller dialing a DID ("direct inward dialing") telephone number 100. A DID phone number is a U.S.-based telephone number that is taken from a block of telephone numbers licensed by the callback service provider. When a subscriber begins service with a callback service provider, he or she is assigned their own personal DID phone number, which is now they access the callback services.

Subsequent to dialing their DID phone number, the caller must listen for the dialed number to ring 102. Upon hearing the ringing, the caller hangs up their telephone 104. These steps 100 through 104 constitute a "Manual Trigger" 126 of the conventional callback system; it is referred to as a "trigger" because it triggers the callback system to begin to provide an outgoing call to the caller.

Once triggered, the conventional callback system will cross-reference the DID phone number with a particular caller telephone number 106. The caller telephone number is recorded by the callback service during the account creation process as discussed more fully below in connection with FIG. 3. The "cross-referencing" described herein consists of the callback system searching its data files to determine what telephone number the caller would like to be called at (as recorded in connection with a particular DID phone number). Presumably, a programmable computer conducts this cross-referencing.

Next, the callback system dials the caller phone number 108 connected with the DID phone number dialed. When their phone rings, the caller must answer their telephone (the caller phone number) 110. Upon answering the call from the callback system, the caller would hear a dial tone 112. The caller then dials the "called phone number" 114; the called phone number is that country or area code and phone number for the number that the caller wishes to talk to. After receiving the called phone number from the caller, the callback system will dial the called telephone number 116. Once the called person answers their phone 118, the caller and the called person may conduct their conversation as they would normally.

Upon completion of the call 120, the caller can end the call by hanging up 122; alternatively, he or she may press a button on their telephone that informs the callback system that they desire to make another telephone call 124. If the caller does this, he or she will be returned to step 112, where the callback system will provide him or her with a dial tone. If we now turn to FIG. 2, we can examine an alternate embodiment of the conventional callback process.

FIG. 2 depicts a conventional email trigger process 12 for the system depicted in FIG. 1. First, the caller drafts a triggering email that includes that caller's unique DID phone number in its subject line 200. This triggering email could be of the conventional type (i.e. generated on a personal computer), or it might be one using the "Short Message Service" (SMS) that is provided by many cellular telephone service providers.

Next, the caller sends the triggering email to the conventional callback system 202. These two steps (200 and 202) comprise the conventional email trigger process 204; once these two steps have been conducted, the conventional process discussed above in connection with FIG. 1 resumes at step #106. It should be recognized that the caller telephone number referred to in this process 12 is the same telephone number referred to in the process of FIG. 1. In other words, it does not matter whether the caller triggers the callback system manually or by email—the callback system will call the same caller phone number in either case. If we turn, now to FIG. 3, we can examine how a potential customer might set up a new account with the conventional callback service provider.

FIG. 3 depicts a conventional account activation process for the system 14 depicted in FIGS. 1 and 2. First, the prospective customer contacts the callback service 300. Next, the prospective customer is asked to answer a questionnaire 302. The questionnaire will request information necessary to qualify the prospect as a customer of the callback system, such as identification of the person, their payment method, and their caller phone number. If the prospective customer is qualified as a callback service customer 304 under the conventional system, they are given the alternative of electing to become an actual customer of the conventional callback service. Once he or she elects to become an actual customer of the service 306, the customer is assigned a unique DID phone number 308. It is only after assignment of this unique DID phone number that the customer account is made functional 310.

The problem with this DID-based callback service is one of the inefficiency and therefore cost related to the assignment of individual DID numbers. Essentially, the callback service must assign 100% of the capacity for a single phone number to a single customer; when a particular block of leased phone numbers is exhausted, new numbers must be licensed, even if the numbers in the previous block are totally unused. What would be preferred would be a system that was scalable by call volume, rather than by the number of customers; that way, expansion (and the corresponding cost) need only be pursued in response to call volume rather than customer volume.

SUMMARY OF THE INVENTION

In light of the aforementioned problems associated with the prior systems and methods, it is an object of the present invention to provide a Sender-Address-Based Telecommunications Operator Call-back System and Method. Unlike the prior systems, the present invention should eliminate the use of a direct inward dialing telephone number. The system should recognize a triggering email or SMS message and associate the message to a particular authorized user. Once authorized, the system should place a call to the caller and then place a call to the called person. The triggering email or SMS message should only require minimal special formatting, such as containing the sender's registered email address in the "from" field and the called number in the "subject" field. The system should permit third party persons to be authorized to make collect calls to the account holder on the account holder's account. The system should further provide the user with periodic account balance updates both manually and automatically as calls are being made.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 7 is a functional diagram of the system of FIGS. 4 and 5.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Sender-Address-Based Telecommunications operator callback System and Method.

Figure 4:
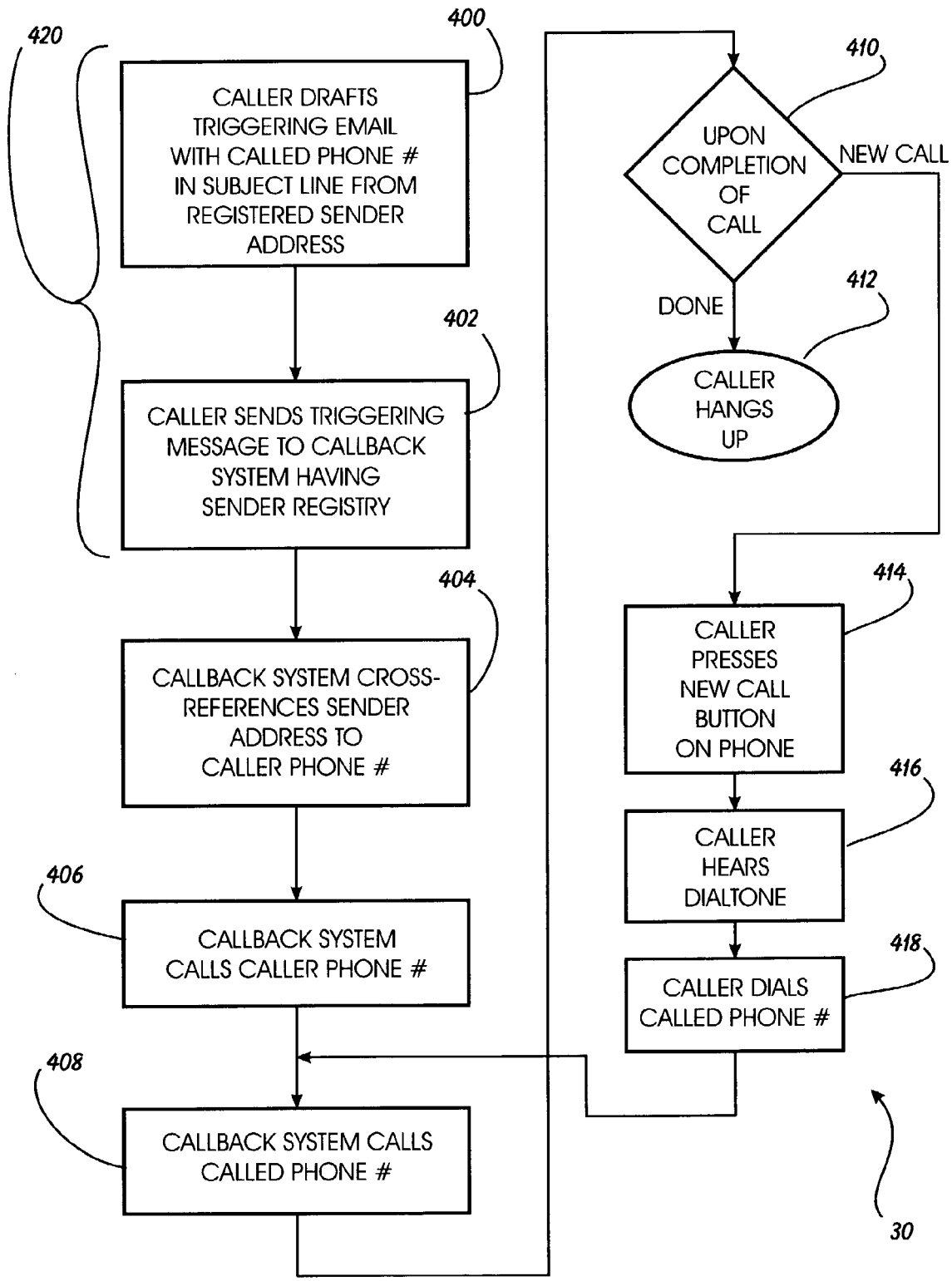
FIG. 4 depicts the callback process of the system of the present invention.

The present invention can best be understood by initial consideration of FIG. 4. FIG. 4 depicts the callback process of the system of the present invention 30. First, the caller drafts a triggering email 400. In this invention, the triggering email (or SMS message) does not contain a DID phone number in the subject line, but rather contains the called phone number (i.e. the phone number that the customer wishes to call using the callback system). It should further be noted that a necessary characteristic of the message is that it contains a registered sender's email address (or SMS address/mobile phone number) in its "from" field in order for it to be handled properly by the callback system. Since the "from" field is generally automatic filled in by the sender's email or SMS software, there is typically no need to manually input or verify that this has been included. It is only important that the address (in the "from" field) has been "registered" with the callback system as is described more fully below in connection with FIG. 5.

Once the triggering message is drafted, the caller sends the message to the callback system (wherein a sender address registry in maintained) 402. Upon receipt of the triggering message, the callback system cross-references the sender's email or SMS address to determine what that caller's phone number is 404. It is critical to note that no DID phone number is used as a cross-reference, but only the sender's email or SMS address (which is based on the mobile phone's phone number or the number registered with the callback system).

Once the callback system successfully determines the appropriate caller phone number, it will call that number 406. Unlike the prior system, the system of the present invention will then (immediately) call the called telephone number 408 without any intervention from the caller. It is pointed out that the user was not required to dial the called phone number; the called number was obtained from the triggering email, and it is not necessary that it be entered again now.

If the user has a deposit account, when the system calls the caller phone number 406, the callback system may further provide the user with his or her account balance; immediately thereafter, the system will call the called phone number 408. Where the "new call" option is selected 410, the account balance would be annunciated either prior to or immediately after the caller dials the called phone number 418.

Upon completion of the call 410, the caller can either hang up 412, or he or she can press a button on the phone that is identified as being the new call button 414. Upon pressing the new call button, the caller can expect to hear a dial tone 416, after which he or she could dial another called phone number 418. When the term "new call button" is used, it should be understood that this is a functionality provided by the callback service, rather than necessarily by a specific button on the keypad of the telephone. For example a sequence of buttons might be assigned to be interpreted by the callback system as being a request for a new call. If we now turn to FIG. 5, we can examine the distinctions between the prior account activation process and that of the present invention.

Figure 5:
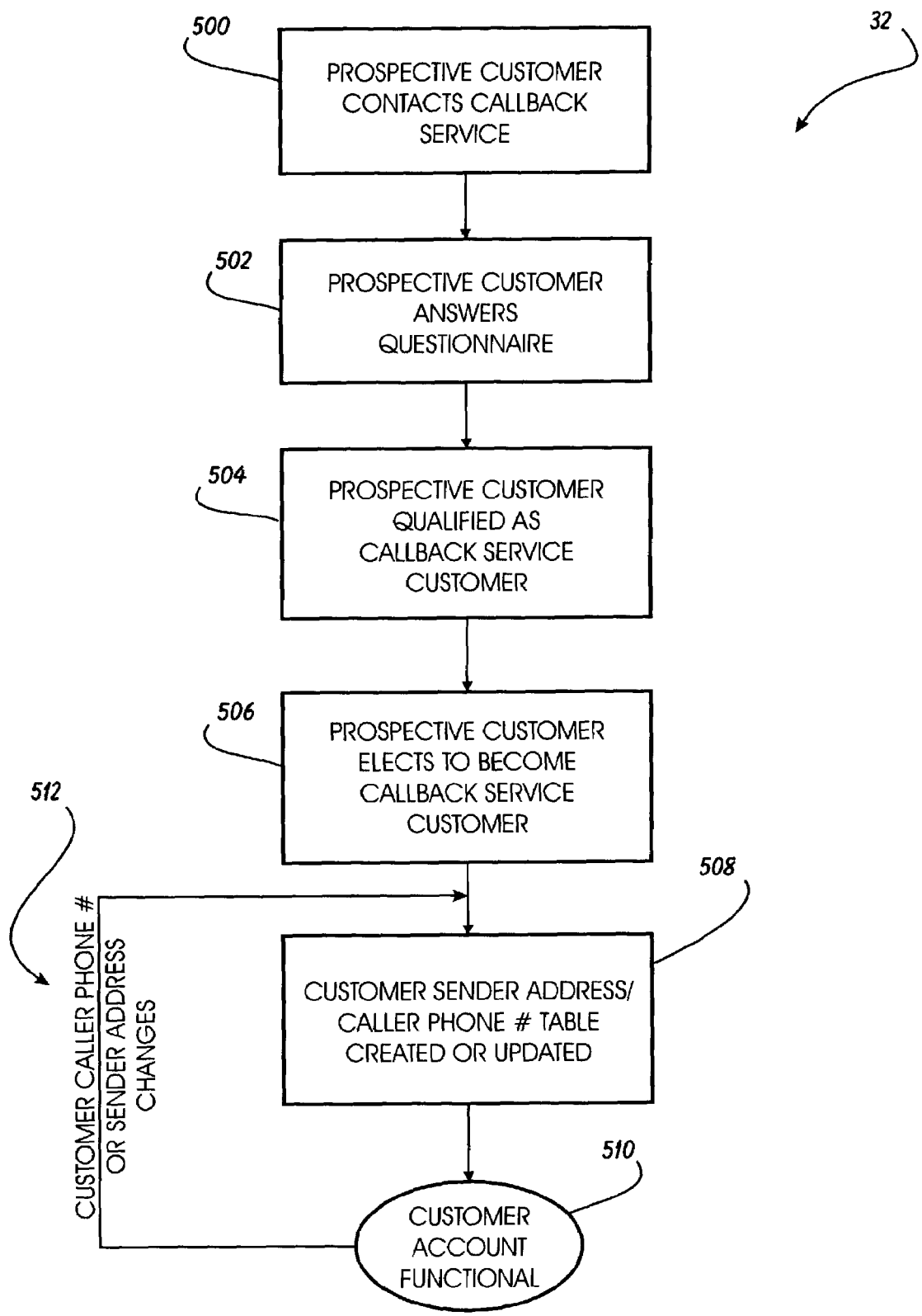
FIG. 5 depicts an embodiment of the account activation process for the system of FIG. 4.

FIG. 5 depicts an embodiment of the account activation process 32 for the system of FIG. 4. First, the prospective customer contacts the callback service 500. Next, the prospective customer answers a questionnaire 502. This questionnaire differs from that of the prior systems in one key way; this questionnaire may also request that the caller enter information regarding caller phone numbers/sender address pairs. An example might be that the prospective customer would enter a work email address and its corresponding work telephone number; this information might be entered now, or later on in the account establishment process.

Assuming that the questionnaire is completed acceptably, the prospective customer will next be qualified by the callback service to be a customer of their surface 504. If the prospective customer elects to become an actual customer of the callback service 506, the customer sender address/caller phone number table will be updated to include this new customer's information 508. It is at this point that the customer's account is fully functional 510. Should the customer wish to add or change the email sender address or caller phone number(s) 512, the customer is permitted to do so at will.

The system is also capable of providing third party persons access to a customer's account in order to make collect calls (i.e. collect calls to the customer). In these cases, the approved user (the third party person) must be added to the customer's account by the customer (added to the account database). When a collect call is made by the third party person, the triggering email (sent by the third party person) will have two phone numbers in the subject line. The called number will be one of the customer's phone numbers; the calling number will be the third party person's phone number (see FIG. 4). In order to further distinguish the present invention from what came before, we will now turn to FIG. 6.

Figure 1:
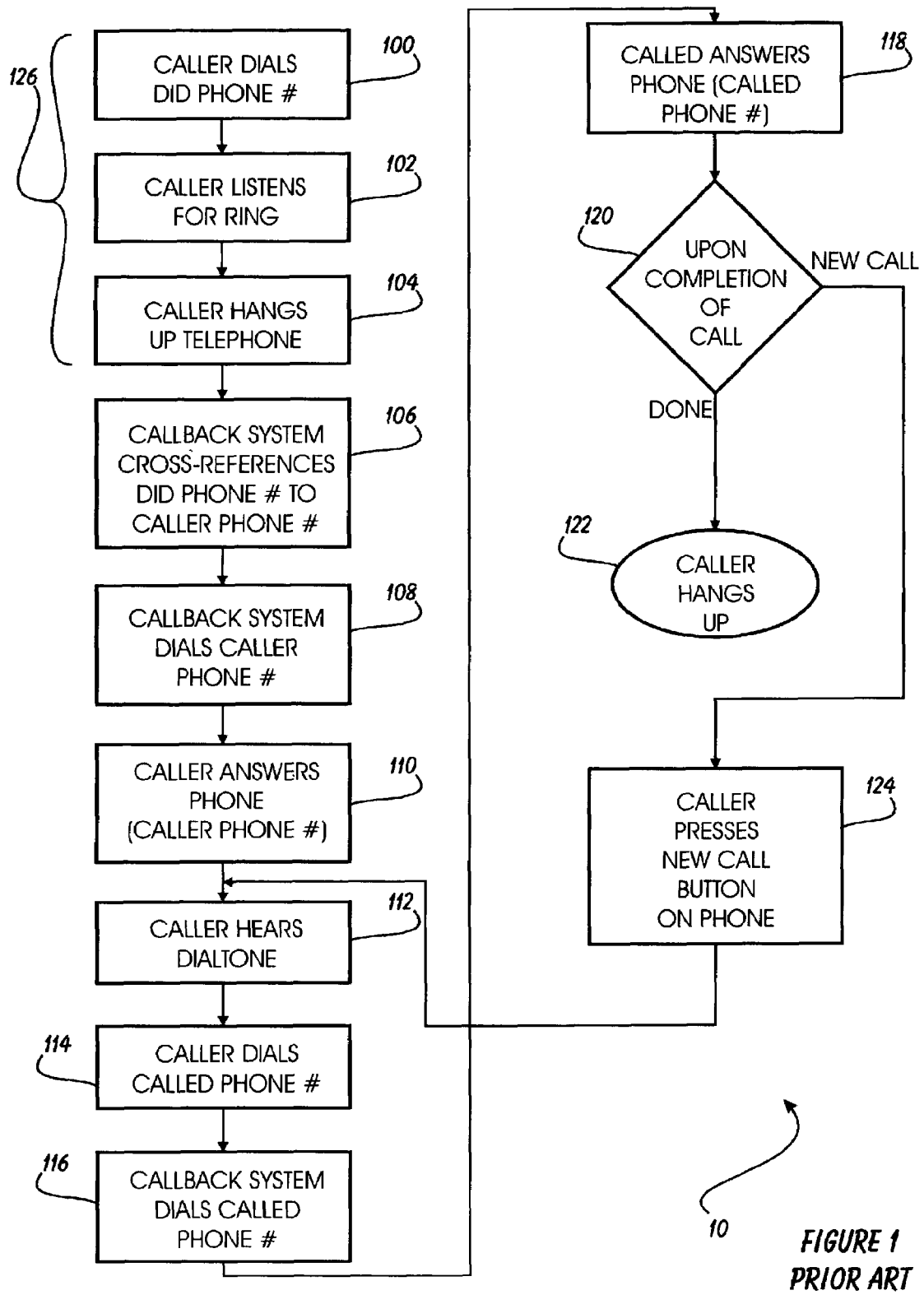
FIG. 1 depicts the conventional callback process.
Figure 2:
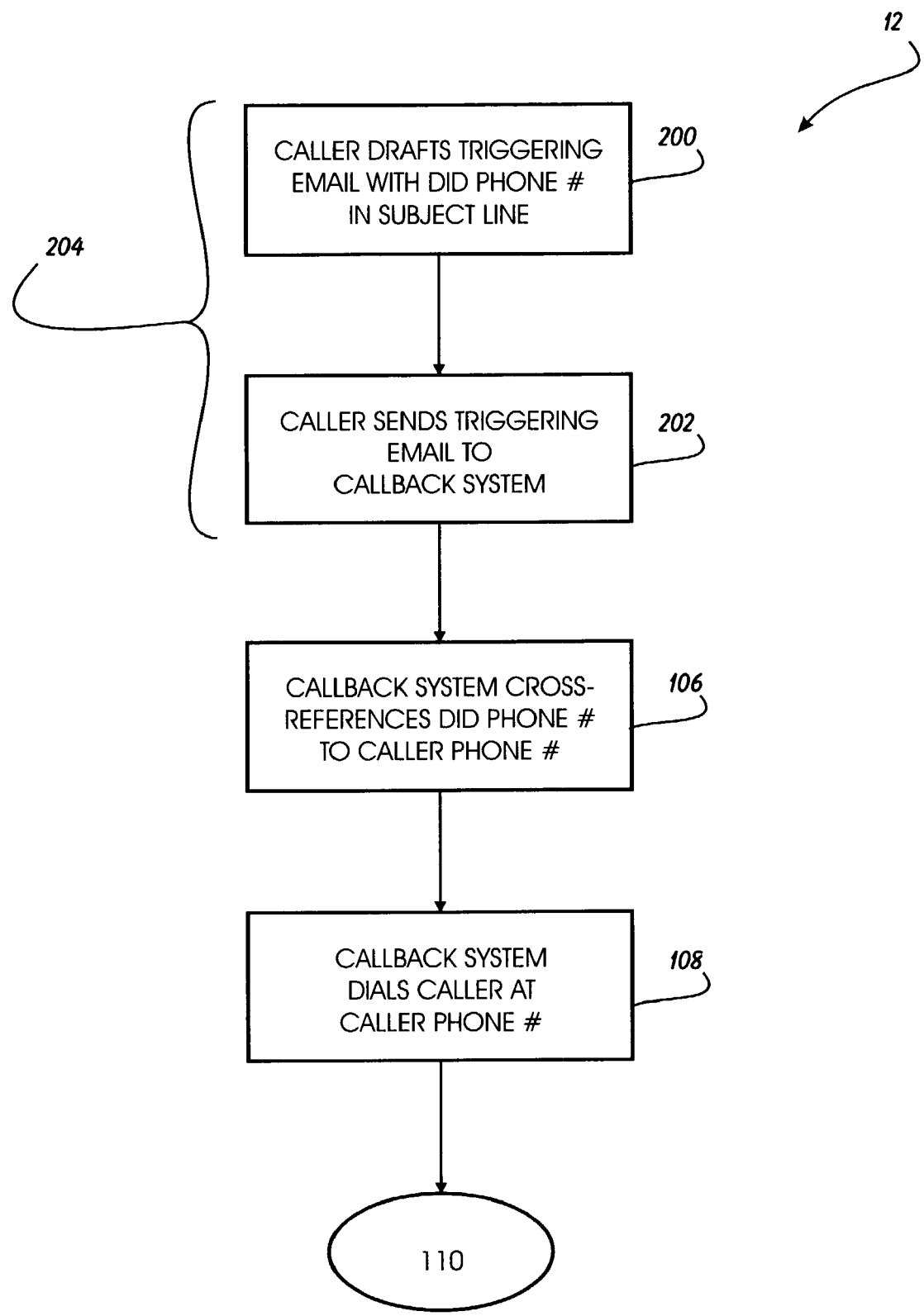
FIG. 2 depicts the conventional email trigger process for the process depicted in FIG. 1.
Figure 3:
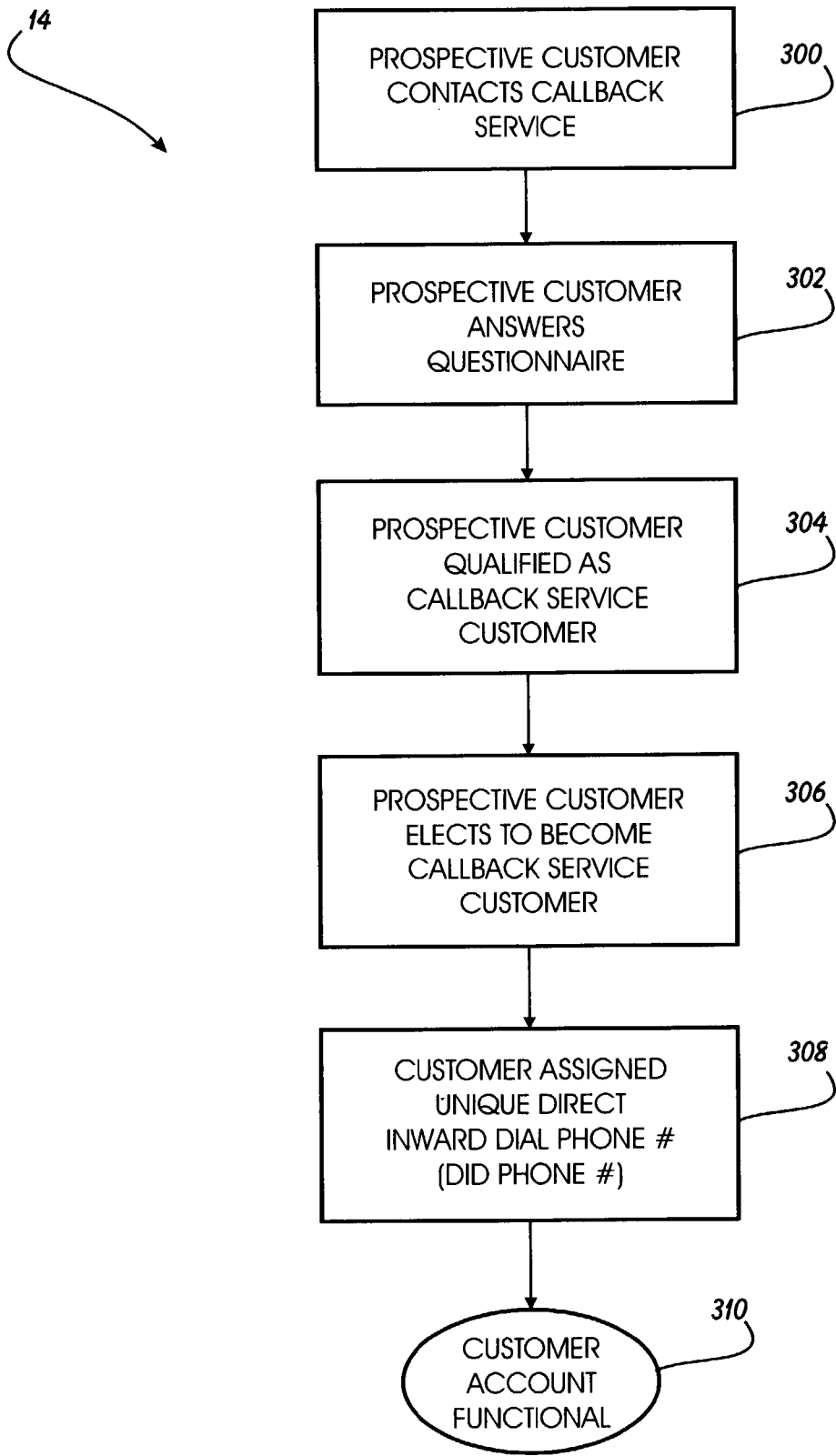
FIG. 3 depicts a conventional account activation process for the system depicted in FIGS. 1 and 2.
Figure 6:
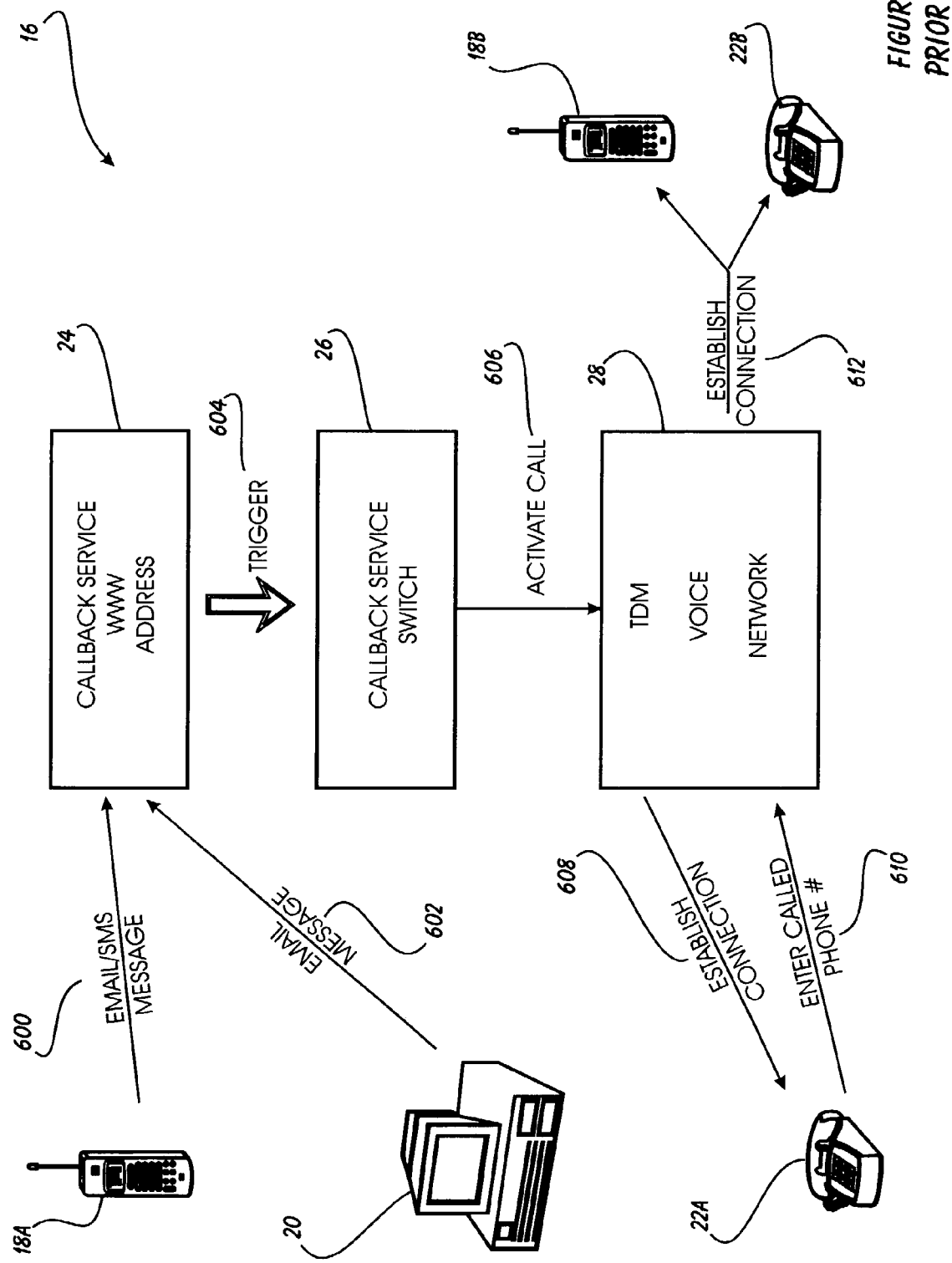
FIG. 6 is a functional diagram of the system of FIGS. 1–3.

FIG. 6 is a functional diagram of the prior art system 16 of FIGS. 1–3; this diagram is provided to further explain how the elements of the conventional system interrelate and/or operate. This diagram only depicts the email trigger version of the prior system previously discussed in order to provide the closest system to the present invention for comparison.

First, a mobile device 18A such as a cellular telephone or other mobile wireless messaging device capable of sending conventional electronic mail messages or SMS messages, sends an email or SMS message 600 addressed to the callback service World Wide Web address. Alternatively, the customer could send an email message 602 from a personal computer 20. As discussed above, the message 600 or 602 must include the customer's DID phone number in its subject line. If authorized, a trigger 604 results, that results in the callback service switch 26 activating a call 606 to emanate from the TDM voice network 28.

The call over the TDM voice network 28 is placed to the "calling phone number" and a connection is established 608. As shown here, a landline phone 22A is at the calling phone number; in other circumstances, a mobile telephone 18 might be at the calling phone number.

Upon receiving the call 608, the customer enters the "called phone number" 610 into the keypad of their phone 22A. In response, the callback service switch 26 utilizes the TDM voice network 28 to establish a connection 612 with a mobile telephone 18B or a landline telephone 22B (whichever is at the called phone number). If we now turn to FIG. 7, we can compare the prior system operation to the operation of the system of the present invention.

FIG. 7 is, a functional diagram 34 of the system of FIGS. 4 and 5. Preliminarily, it is pointed out that a plurality of "locations" are depicted, rather than specific telephones, computers or messaging devices. This is depicted to illustrate one substantial improvement of the present invention over the prior are, namely, that calls can be initiated and conducted from a variety of different locations; there is no limitation to a single "caller phone number" location as with the prior systems.

Mobile "location" 36 contains a mobile device 18A; in this case, the device must be able to function as a telephone in addition to having messaging capability. First "fixed" location 38A contains a personal computer 20A and a landline telephone set 22A. Second fixed location 38B contains another personal computer 20B and another landline telephone set 22B. This arrangement might depict the situation where mobile location 36 is the customer's cellular telephone, first fixed location 38A is the customer's work location, and the second fixed location 38B is the customer's home location. It should be recognized that these locations 36 and 38 are simply examples of the number of locations and the type of equipment that might be included in the system of the present invention.

The process commences with either an email or SMS message being sent 700 to the callback service World Wide Web address 40 by the mobile phone 18A at location 36. Alternatively, an email message could be sent 702 or 704 from either the first or second fixed location 38A or 38B, respectively (i.e. the personal computer 20A). The message 700, 702 or 704 reaches the callback service 40 and results in what was referred to previously as an email trigger 706. Unlike the prior system(s), the trigger 706 results in the next act being that the callback service cross-reference processor 42 (embodied in a computing device) selects the location phone number (from the "from" field of the message received by the callback service) and the called phone number 708 (from the subject line of the message 700, 702 or 704).

The callback service switch 44 then activates the calls 710 via the TDM voice network 28, and establishes a connection 712 to whichever location 36 or 38 was identified by the "from" field of the triggering message, and then the network 28 establishes a connection 714 with the called phone number (which could be either a mobile or landline telephone).

It should be apparent that at least three advancements of the present invention provide substantial utility and ease of use, namely: (1) the efficiency of eliminating the DID from the callback service; (2) the ability to initiate and conduct calls from several different locations; and (3) the elimination of many of the manual steps required for making calls on the prior system.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for placing telephone calls, comprising the steps of:

creating a unidirectional triggering message from a message sender, said triggering message comprising digital data further including information identifying said message sender;

sending said triggering message to a callback service provider in communication with a callback service system, said sending conducted via a computer network;

identifying a caller phone number responsive to said message sender identifying information, said identifying conducted by said callback service system being executed on a programmable computer; and placing a telephone call to said caller telephone number said placing responsive to said message sender information.

2. The method of claim 1, wherein:

said creating step further comprises including digital data identifying a called telephone number; and said placing telephone call step is followed by a second placing telephone call step comprising placing a telephone call to said called telephone number.

3. The method of claim 2, wherein said creating step is preceded by a cross-reference data file creating step, said data file creating step comprising creating a data file including digital data indicating linked pairs of message sender identity data and caller telephone number data.

4. The method of claim 3, wherein said identifying step comprises locating said caller telephone number data linked to said sender identity data contained in said digital data of said triggering message, said locating resulting from searching said cross-reference data file.

5. A method for creating a customer account for a telephonic callback system, the method comprising the steps of:
   a contacting step wherein a prospective customer establishes communication with a telephonic callback service provider; and
   a table creation step wherein said telephonic callback service creates at least one message sender address/caller phone number data record in a data repository accessible by a programmable computer.

6. The method of claim 5, further comprising a qualification step executed prior to said table creation step wherein said prospective customer is qualified as a customer of said telephonic callback service provider.

7. The method of claim 6, further comprising a questionnaire answering step prior to said qualification step, wherein said prospective customer answers questions posed by said telephonic callback service provider.

8. The method of claim 7 further comprising an election step prior to said table creation step, said election step comprising said prospective customer electing to become a customer of said telephonic callback service provider and communicating said election to said service provider.

9. The method of claim 5, further comprising a qualification step executed subsequent to said table creation step wherein said prospective customer is qualified as a customer of said telephonic callback service provider.

* * * * *